United States Patent [19]
Rixon et al.

[11] Patent Number: 5,632,183
[45] Date of Patent: May 27, 1997

[54] ADJUSTABLE PEDAL ASSEMBLY

[75] Inventors: Christopher J. Rixon, Tecumseh, Canada; Christopher Bortolon, Clawson, Mich.

[73] Assignee: Comfort Pedals, Inc., Warren, Mich.

[21] Appl. No.: 513,017

[22] Filed: Aug. 9, 1995

[51] Int. Cl.$^6$ .................................................. G05G 1/14
[52] U.S. Cl. ................................................ 74/512; 74/560
[58] Field of Search ............................ 74/478, 512, 513, 74/514, 560; 403/109, 377

[56] References Cited

U.S. PATENT DOCUMENTS

| | | | |
|---|---|---|---|
| 3,151,499 | 10/1964 | Roe | 74/560 |
| 3,319,487 | 5/1967 | Lystad et al. | 74/560 |
| 3,359,821 | 12/1967 | Beardsley et al. | 74/478 |
| 3,643,525 | 2/1972 | Gibas | 74/512 |
| 3,958,677 | 5/1976 | Spanelis | 74/513 |
| 4,870,871 | 10/1989 | Ivan | 74/513 |
| 4,875,385 | 10/1989 | Sitrin | 74/512 |
| 4,989,474 | 2/1991 | Cicotte et al. | 74/512 |
| 5,010,782 | 4/1991 | Asano et al. | 74/512 |
| 5,078,024 | 1/1992 | Cicotte et al. | 74/512 |
| 5,460,061 | 10/1995 | Redding et al. | 74/512 |

*Primary Examiner*—Charles A. Marmor
*Assistant Examiner*—Mary Ann Battista
*Attorney, Agent, or Firm*—Young & Basile, P.C.

[57] ABSTRACT

An adjustable control pedal apparatus for a motor vehicle. The pedal assembly is slidably mounted at its upper end on a single hollow guide rod extending rearwardly from a transmission housing which in turn is pivotally mounted to a bracket secured to the firewall of the vehicle. A nut is positioned slidably within the hollow guide rod and a screw shaft extends rearwardly from the transmission housing for threaded engagement with the nut. A key extends from the nut to the pedal assembly so that linear movement of the nut within the hollow rod as generated by rotation of the screw shaft results in forward and rearward movement of the pedal assembly along the guide rod. The screw shaft is driven by a transmission positioned in the transmission housing and the transmission is in turn driven by a cable driven by an electric motor.

15 Claims, 3 Drawing Sheets

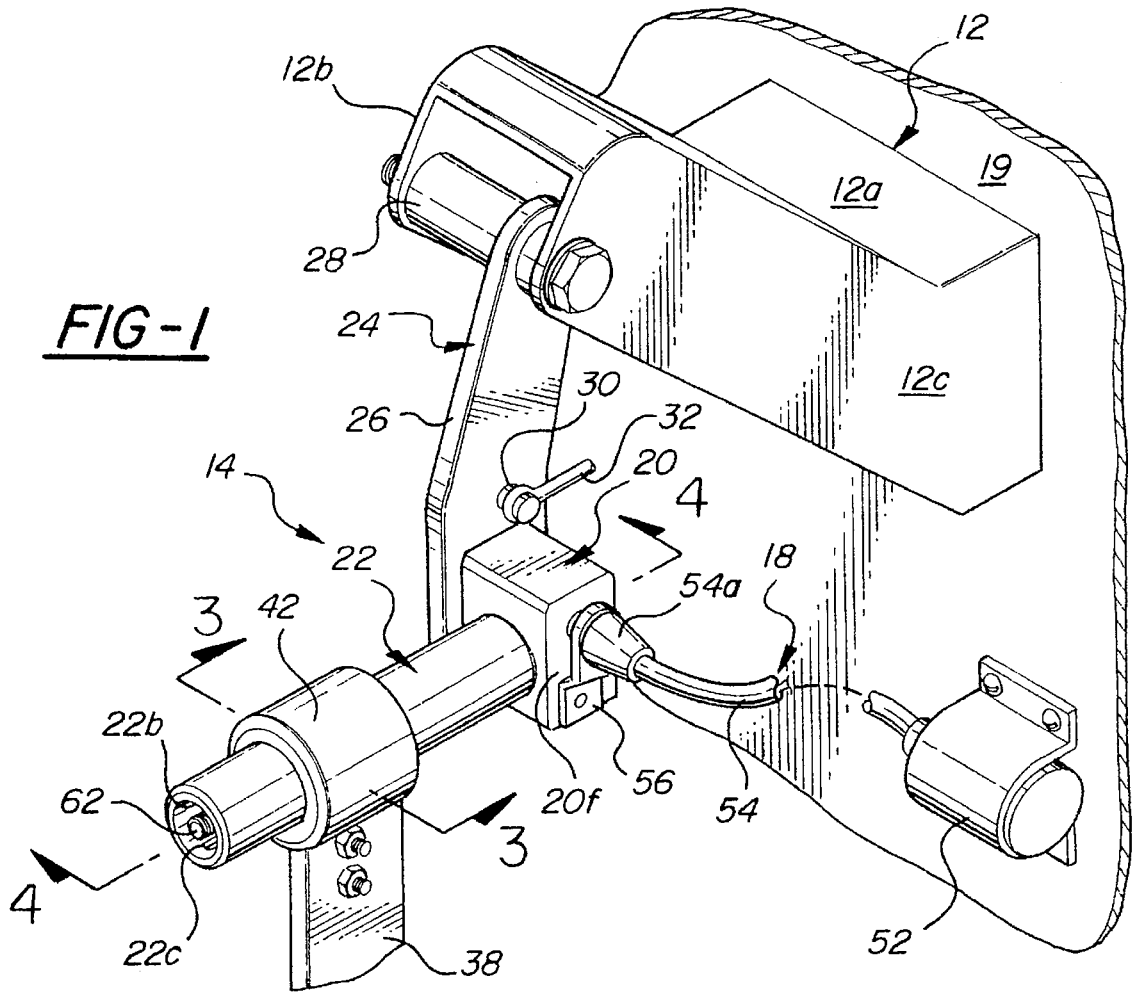
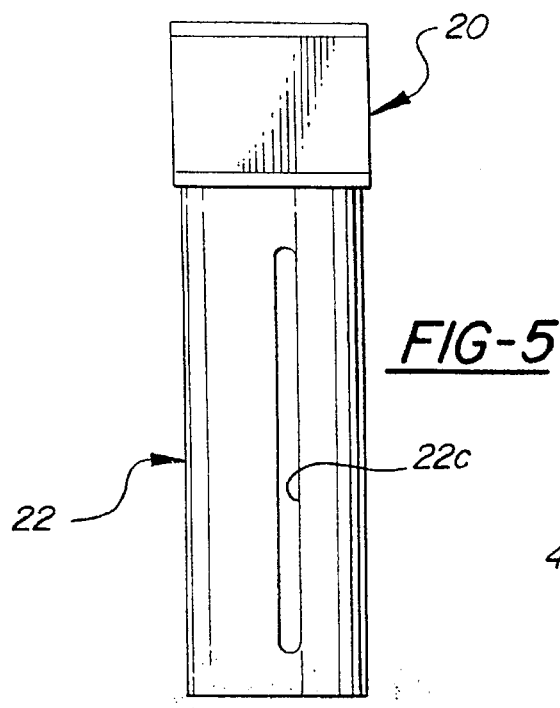
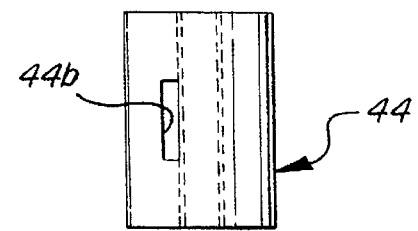
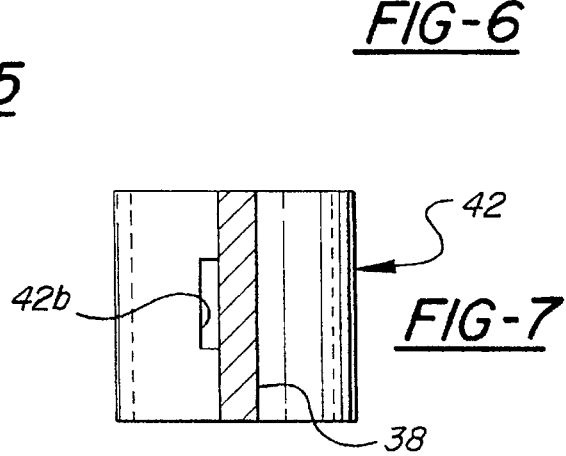
FIG-1
FIG-5
FIG-6
FIG-7

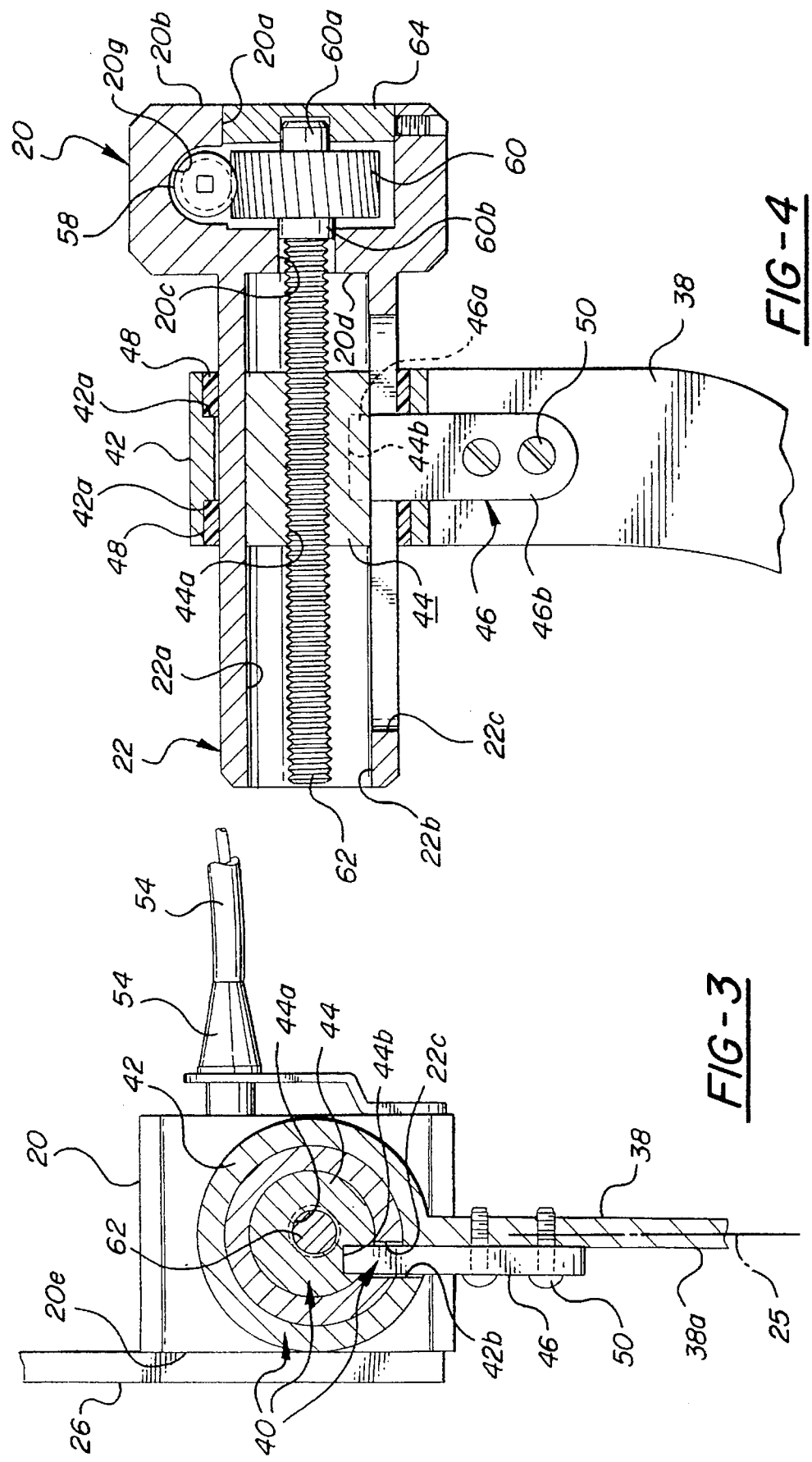

ADJUSTABLE PEDAL ASSEMBLY

BACKGROUND OF THE INVENTION

This invention relates to control pedal apparatuses and more particularly to adjustment means for selectively adjusting the position of one or more of the control pedals of a motor vehicle.

In a conventional automotive vehicle pedals are provided for controlling brakes and engine throttle. If the vehicle has a manual transmission a clutch pedal is also provided. These pedals are foot operated by the driver. In order for the driver to maintain the most advantageous position for working these control pedals the vehicle front seat is usually slidably mounted on a seat track with means for securing the seat along the track in a plurality of adjustment positions.

The adjustment provided by moving the seat along the seat track does not accommodate all vehicle operators due to differences in anatomical dimensions. Further, there is growing concern that the use of seat tracks, and especially long seat tracks, constitutes a safety hazard in that the seat may pull loose from the track during an accident with resultant injuries to the driver and/or passengers. Further, the use of seat tracks to adjust the seat position has the effect of positioning shorter operators extremely close to the steering wheel where they are susceptible in an accident to injury from the steering wheel or from an exploding air bag. It is therefore desirable to either eliminate the seat track entirely or shorten the seat track to an extent that it will be strong enough to retain the seat during an impact. Shortening or eliminating the seat track requires that means be provided to selectively move the various control pedals to accommodate various size drivers.

Various proposals were made over a period of many years to provide selective adjustment of the pedal positions to accommodate various size drivers but none of these proposals met with any significant commercial acceptance since the proposed mechanisms were unduly complex and expensive and/or were extremely difficult to operate and/or accomplished the required pedal adjustment only at the expense of altering other critical dimensional relationship as between the driver and the various pedals. Recently a control pedal mechanism has been developed which is simple and inexpensive and easy to operate and that accomplishes the required pedal adjustment without altering further critical dimensional relationships as between the driver and the various pedals. This control pedal mechanism is disclosed in U.S. Pat. Nos. 4,875,385; 4,989,474 and 5,078,024 all assigned to the assignee of the present application. The present invention represents improvements to the basic adjustable control pedal design disclosed in these patents.

SUMMARY OF THE INVENTION

This invention is directed to the provision of a simple, inexpensive and effective apparatus for adjusting the control pedals of a motor vehicle.

This invention adjustable pedal apparatus is intended for use with any of the control pedals of a motor vehicle and provides a simple and effective means of adjusting the position of the pedal to match the particular anatomical dimension of the operator.

The invention pedal apparatus includes a pedal support structure including a forward mounting structure and a guide rod extending rearwardly and rigidly from the mounting structure; a screw shaft extending proximate to and parallel to the guide rod; drive means for driving the screw shaft; and a pedal structure including an upper guide structure, defining a smooth guide bore slidably receiving the guide rod and a threaded bore threadably receiving the screw shaft, and a pedal arm extending downwardly from the upper guide structure. This arrangement provides a simple and effective means for readily adjusting the position of the pedal structure.

According to a further feature of the invention, the guide rod is hollow; the screw shaft is positioned concentrically within the hollow of the guide rod; and the upper guide structure of the pedal structure includes an outer hub structure slidably mounted on the guide rod, a nut positioned slidably within the hollow of the guide rod and threadably receiving the screw shaft, and drive means drivingly interconnecting the structure and the nut. This specific packaging arrangement as between the pedal structure, screw shaft and guide rod provides a compact and simple apparatus for readily adjusting the pedal position.

According to a further feature of the invention, an elongated slot is provided in the hollow guide rod structure and the drive means comprises a key secured at one end thereof to the nut, passing through the slot, and interconnecting the nut and the pedal structure. This specific driving arrangement as between the nut and the pedal structure provides a simple and effective drive package.

According to a further feature of the invention, the forward mounting structure includes a transmission housing rearwardly of the guide rod; the drive means includes a transmission positioned in the transmission housing and including a first transmission member driving the screw shaft and a second transmission member driving the first transmission member, and the drive means further includes a cable driving the second transmission member. This specific arrangement provides a simple and efficient means for providing the power for moving the pedal structure.

BRIEF DESCRIPTION OF THE DRAWINGS

FIG. 1 is a perspective fragmentary view of the invention adjustable pedal assembly;

FIGS. 3 and 4 are cross-sectional views taken respectively on lines 3—3 and 4—4 of FIG. 1; and FIGS. 5, 6 and 7 are detail bottom views of individual components of the pedal assembly.

DETAILED DESCRIPTION OF THE PREFERRED EMBODIMENT

Figure 2:
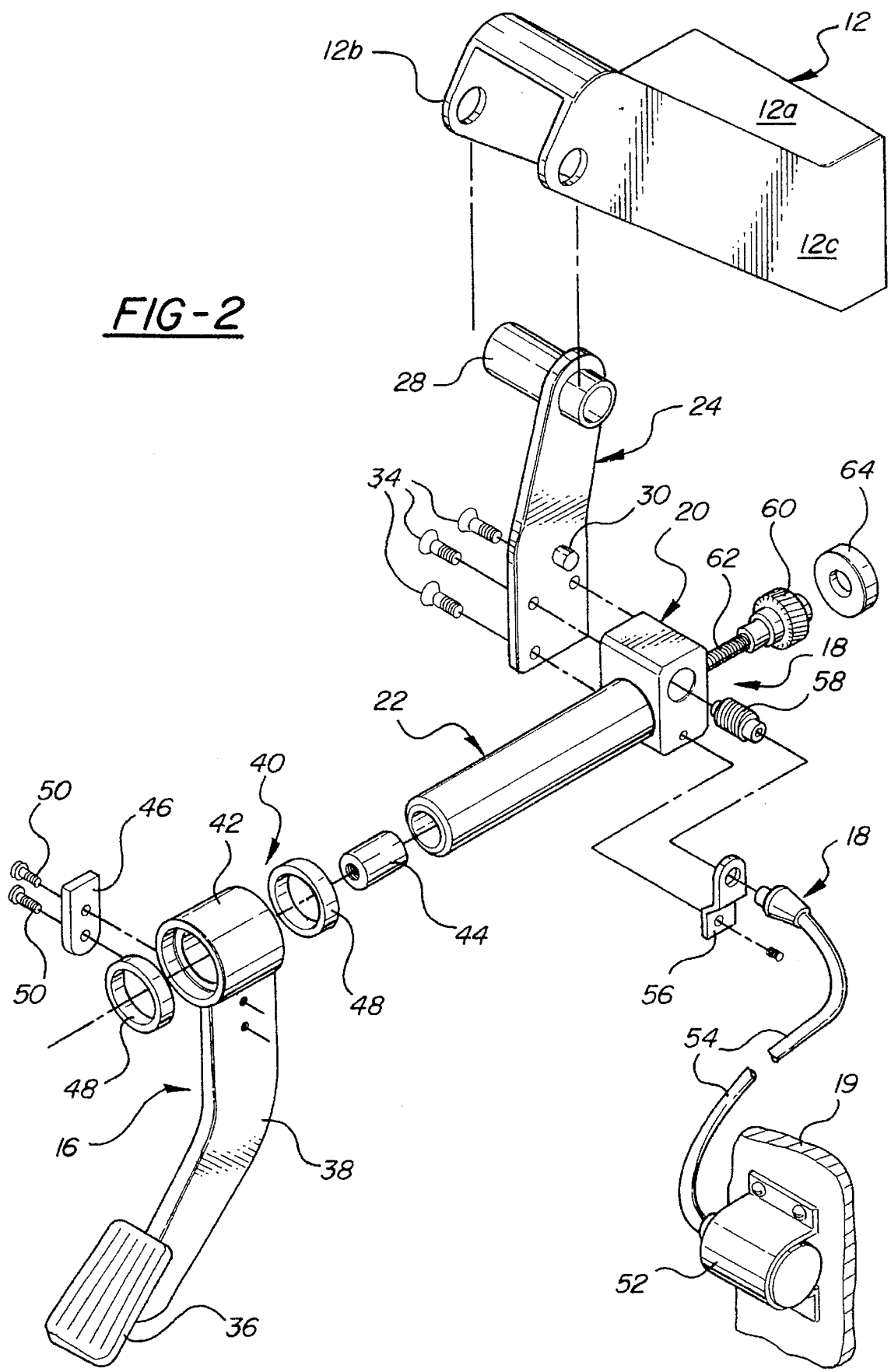
FIG. 2 is an exploded view of the pedal assembly.

The invention control pedal apparatus, broadly considered, includes a mounting bracket 12, a pedal support assembly 14, a pedal assembly 16, and a drive assembly 18.

Mounting bracket 12 may be formed of any suitable sheet metal material in a suitable stamping operation and is intended for suitable securement to the firewall 19 of the associated motor vehicle. Bracket 12 includes a top wall 12a and laterally spaced side walls 12b and 12c.

Pedal support assembly 14 includes a transmission housing 20, a circular guide rod 22, and a pivot arm 24. Transmission housing 20 and guide rod 22 may be formed as separate items but preferably, as shown, are formed as a single forged piece.

Transmission housing 20 has a generally cubical configuration and defines a hollow 20a opening at the front face 20b of the housing and a central bore 20c defined in a rear wall 20d of the housing.

Guide rod 22 extends rigidly rearwardly from the rear wall 20d of the transmission housing 20, is hollow so as to provide a tubular configuration defining a central bore 22a concentric with bore 20c, is open at its rear end 22b, and includes a bottom axial slot 22c extending from a location proximate transmission wall 20d to a location proximate rod rear end 22b. Slot 22c is offset relative to the central vertical axis 25 of the apparatus.

Pivot arm 24 includes an elongated plate 26, a pivot pin 28 fixedly secured to the upper end of the plate 26 and suitably pivotally mounted proximate the rear end of bracket 12 in bracket side walls 12b and 12c, and a control pin 30 fixedly secured to plate 24 and adapted to pivotally receive one end of a control rod 32 controlling, for example, the brake mechanism of the motor vehicle. The lower end of plate 24 is fixedly secured as by fasteners 34 to a side face 20e of transmission housing 20.

Pedal assembly 16 includes a pedal 36, a pedal arm 38 carrying the pedal 36 at its lower end, and an upper guide structure 40.

Upper guide structure 40 includes a hub structure 42, a nut 44 and a key 46.

Hub structure 42 is fixedly secured to the upper end of pedal arm 38 and is sized to be slidably mounted on guide rod 22 with the aid of bushings 48 positioned in suitable annular recesses 42a proximate the forward and rearward annular edges of the hub structure. Hub structure 42 and bushings 48 will be seen to coact to define a smooth guide bore slidably receiving guide rod 22 whereby to enable the pedal assembly to move smoothly axially forwardly and rearwardly with respect to the guide rod.

Nut 44 may be formed of plastic, has a circular cross-sectional configuration, is sized to fit slidably within the bore 22a of the guide rod, and includes a threaded central bore 44a.

Key 46 has an elongated plate configuration and is fixedly secured at its upper end 46a in a keyway 44b provided in the lower face of nut 44 in offset relation to the central vertical axis 25 of the apparatus. Key 46 passes downwardly through elongated axial slot 22c in the lower side of the guide rod and through an aperture 42b in the hub structure 42 for securement at its lower end 46b, utilizing fasteners 50, to side face 38a of pedal arm 38.

Drive assembly 18 includes a motor 52, a cable 54, a bracket 56, a worm 58, a worm wheel 60, and a screw shaft 62.

Motor 52 comprises a small electric motor of known form and may be secured, for example, to firewall 19. Cable 54 is driven by the output shaft of motor 52 and is mounted at its distal end 54a on a bracket 56 secured to side face 20f of transmission housing 20. Cable 54 drives a worm 58 journalled in a cross bore 20g in transmission housing 20 in overlying relation to housing cavity 20a. Worm 58 is in driving engagement with worm wheel 60 positioned in cavity 20a.

Worm wheel 6o includes a front trunion 60a journalled in a bushing 64 fixedly positioned in the open forward end of cavity 20a and a rear trunion 60b journalled in a counterbore 20g of bore 20c. Screw shaft 62 is fixedly secured to worm wheel 60 and extends rearwardly therefrom through bore 20c and rearwardly through guide rod bore 20a for threaded engagement with the threaded central bore 44a of nut 44 so that rotation of shaft 62 has the effect of sliding nut 44 forwardly and rearwardly within bore 22a.

To assembly the invention apparatus, pivot pin 28 is suitably mounted in bracket 12, the lower end of plate 26 is fixedly secured to transmission housing 20, nut 44 is positioned within bore 22a in threaded engagement with screw 62, and hub structure 42 is positioned in surrounding relation to guide rod 22. With pedal arm 38 extending downwardly so as to align aperture 42b with slot 22c, nut 44 is suitably adjusted angularly within bore 22a to align keyway 44b angularly with respect to slot 22c and aperture 42b, hub structure 42 is adjusted axially to align aperture 42b axially with keyway 44b, and key 46 is slid upwardly through aperture 42b and through slot 22c for seating engagement in keyway 44b, whereafter the key is fixedly secured at its lower end 46b to side face 38a of pedal arm 38 utilizing fasteners 50. The apparatus is now ready for installation in a motor vehicle.

Installation in a motor vehicle is accomplished simply by securing the bracket 12 and the motor 52 to the firewall 19 of the vehicle and coupling control rod 32 to control panel 30.

In operation, the position of the pedal 36 relative to the operator is selectively adjusted by selectively energizing motor 52 to selectively move nut 44 forwardly and rearwardly within guide rod bore 22a and thereby, via the key 46, move the pedal assembly selectively forwardly and rearwardly along the guide rod with the limits of forward and rearward movement determined by engagement of the key with the respective forward and rearward ends of the slot 22c.

The invention will be seen to provide an adjustable pedal apparatus that is extremely simple in structure, extremely reliable, extremely inexpensive, and capable of precisely adjusting the position of the pedal so as to accommodate operators of varying anatomical dimensions.

Whereas a preferred embodiment of the invention has been illustrated and described in detail it will be apparent that various changes may be made in the disclosed embodiment without departing from the scope or spirit of the invention. For example, although the invention has been illustrated and described with respect to an adjustable apparatus in which no provision is made to provide constant ratio adjustment, and constant pedal loads, in all adjusted positions of the pedal, the invention is equally applicable to an adjustable apparatus, such for example as the apparatuses shown in assignee's U.S. Pat. Nos. 4,875,385; 4,989,474 and 5,078,024, in which provision is made to provide constant ratio adjustment and constant pedal force irrespective of pedal position. Further, although the invention as disclosed contemplates that each individual operator will adjust the pedals to suit his own stature each time he enters the vehicle after the vehicle has been operated by another operator, the motor of the pedal assembly may be equipped with a memory facility whereby an operator may effect movement of the pedal assembly to his own unique position simply by suitably announcing his presence in the vehicle and allowing the memory to automatically move the pedal assembly to his own unique position.

We claim:

1. An adjustable pedal apparatus for a motor vehicle comprising:

a pedal support assembly including a forward mounting structure and a hollow guide rod extending rearwardly and rigidly from the mounting structure;

a screw shaft positioned within the hollow of the guide rod and extending parallel to said guide rod;

drive means for driving the screw shaft; and a pedal assembly including a hub structure defining a smooth guide bore slidably receiving said guide rod, a nut positioned within the hollow rod and defining a threaded bore threadably receiving said screw shaft, a pedal arm extending downwardly from said hub structure, and means drivingly interconnecting the nut and the hub structure whereby rotation of the screw shaft moves the nut within the hollow rod and the drive means translates the nut movement into movement of the hub structure and the pedal arm.

2. An apparatus according to claim 1 wherein:

the apparatus further includes a mounting bracket; and the forward mounting structure is pivotally secured to the mounting bracket.

3. An apparatus according to claim 1 wherein:

the guide rod and the guide bore have a circular cross sectional configuration.

4. An apparatus according to claim 1 wherein:

an elongated slot is provided in the hollow guide rod; and the interconnecting means comprises rigid structure passing through the slot and rigidly interconnecting the nut and the hub structure.

5. An apparatus according to claim 1 wherein:

the forward mounting structure includes a transmission housing forwardly of the guide rod;

the drive means includes a transmission positioned in the transmission housing and including a first transmission member driving the screw shaft and a second transmission member driving the first transmission member; and the drive means further includes a cable driving the second transmission member.

6. An apparatus according to claim 5 wherein the drive means further includes an electric motor driving the cable.

7. An apparatus according to claim 5 wherein:

the pedal support assembly further includes a mounting bracket; and the forward mounting structure further includes a pivot arm fixed to the transmission housing and pivotally mounted on the mounting bracket.

8. An adjustable pedal apparatus for a motor vehicle comprising:

a mounting bracket;

a hollow guide rod;

means pivotally mounting the guide rod on the mounting bracket with the guide rod extending rearwardly;

a pedal structure including an upper hub structure slidably mounted on the guide rod and a pedal arm extending downwardly from the hub structure;

a nut positioned slidably in the hollow of the guide rod;

a screw positioned within the guide rod and threadably engaging the nut;

drive means interconnecting the nut and the pedal structure; and means for rotating the screw.

9. A pedal apparatus according to claim 8 wherein the rotating means are positioned forwardly of the screw.

10. A pedal apparatus according to claim 8 wherein:

the guide rod includes an elongated axial slot; and the drive means includes a key fixed to the nut and passing through the elongated slot for securement to the pedal structure.

11. A pedal apparatus according to claim 8 wherein:

the apparatus includes a housing positioned forwardly of the guide rod; and the rotating means includes transmission means positioned in the housing and including a first transmission member driving the screw and a second transmission member driving the first transmission member.

12. A pedal apparatus according to claim 11 wherein:

the rotating means further includes an electric motor and a cable driven by the electric motor and driving the second transmission member.

13. An adjustable pedal apparatus for a motor vehicle comprising:

a pedal support assembly including a forward mounting structure and a hollow guide rod extending rearwardly and rigidly from the mounting structure and including an elongated slot;

a screw shaft positioned concentrically within the hollow of the guide rod and extending proximate and parallel to the guide rod;

drive means for driving the screw shaft; and a pedal assembly including an upper guide structure and a pedal arm extending downwardly from said upper guide structure;

the upper guide structure including an outer hub structure slidably mounted on the guide rod and including an aperture, a nut positioned slidably within the hollow of the guide rod and threadably receiving the screw shaft, and means drivingly interconnecting the pedal assembly and the nut;

the interconnecting means comprising a key secured at one end thereof to the nut, passing through the slot in the rod and through the aperture in the hub structure, and secured at its other end to the pedal arm.

14. An adjustable pedal apparatus for a motor vehicle comprising:

a mounting bracket;

a hollow guide rod including an elongated axial slot;

means pivotally mounting the guide rod on the mounting bracket with the guide rod extending rearward;

a pedal structure including an upper hub structure slidably mounted on the guide rod and including an aperture and a pedal arm extending downwardly from the hub structure;

a nut positioned slidably in the hollow of the guide rod;

a screw positioned within the guide rod and threadably engaging the nut;

means for rotating the screw; and a key fixed to the nut and passing through the elongated slot and through the aperture for securement to the pedal structure.

15. An adjustable pedal apparatus for a motor vehicle comprising:

a pedal support assembly including a forward mounting structure and a hollow guide rod extending rearwardly and rigidly from the mounting structure;

a screw shaft positioned within the hollow of the guide rod and extending parallel to the guide rod;

drive means for driving the screw shaft; and a pedal assembly including an upper guide structure defining a smooth guide bore slidably receiving said guide rod, a nut positioned within the hollow rod and defining a threaded bore threadably receiving said screw shaft, a pedal arm extending downwardly from said upper guide structure, and means drivingly interconnecting the nut and the guide structure whereby rotation of the screw shaft moves the nut within the hollow rod and the drive means translates the nut movement into movement of the guide structure and the pedal arm.

* * * * *